(12) United States Patent
Rizkin et al.

(10) Patent No.: US 8,360,615 B2
(45) Date of Patent: Jan. 29, 2013

(54) LED LIGHT MODULE FOR OMNIDIRECTIONAL LUMINAIRE

(75) Inventors: Alexander Rizkin, Rodondo Beach, CA (US); Robert H. Tudhope, Rancho Palos Verdes, CA (US)

(73) Assignee: Farlight, LLC, Newport Beach, CA (US)

( * ) Notice: Subject to any disclaimer, the term of this patent is extended or adjusted under 35 U.S.C. 154(b) by 480 days.

(21) Appl. No.: 11/933,248

(22) Filed: Oct. 31, 2007

(65) Prior Publication Data

US 2008/0192480 A1 Aug. 14, 2008

Related U.S. Application Data

(63) Continuation-in-part of application No. 10/277,230, filed on Oct. 21, 2002, now Pat. No. 7,503,669, which is a continuation-in-part of application No. 09/566,521, filed on May 8, 2000, now Pat. No. 6,543,911.

(51) Int. Cl.
*F21V 7/04* (2006.01)
*F21V 7/10* (2006.01)

(52) U.S. Cl. ............ 362/296.05; 362/304; 362/348

(58) Field of Classification Search ........ 362/241, 362/245, 247, 310, 348, 296.05–296.09, 362/341, 347, 800, 297, 304, 305; 359/868, 359/869

See application file for complete search history.

(56) References Cited

U.S. PATENT DOCUMENTS

| | | | |
|---|---|---|---|
| 1,676,463 A | 7/1928 | Ryan | |
| 1,888,995 A | 11/1932 | Matter | |
| 2,215,900 A | 9/1940 | Bitner | |
| 2,589,569 A | 3/1952 | Peter et al. | |
| 3,610,912 A | 10/1971 | Schwartz | |
| 3,852,584 A | 12/1974 | Levin | |
| 3,875,561 A | 4/1975 | Scarpino et al. | |
| 4,337,759 A | 7/1982 | Popovich et al. | |
| 4,355,350 A | 10/1982 | Mader | |
| 4,382,274 A | 5/1983 | De Backer et al. | |
| 4,617,768 A | 10/1986 | Gebelius | |
| 4,678,269 A | 7/1987 | Pace | |
| 4,767,172 A | 8/1988 | Nichols et al. | |
| 4,768,133 A | 8/1988 | Simons et al. | |
| 4,826,273 A * | 5/1989 | Tinder et al. | 362/488 |
| 4,915,484 A | 4/1990 | Yamamoto | |
| 5,103,381 A | 4/1992 | Uke | |

(Continued)

FOREIGN PATENT DOCUMENTS

| | | |
|---|---|---|
| CN | 87107021 | 4/1988 |
| DE | 2201574 A1 | 7/1973 |

(Continued)

OTHER PUBLICATIONS

Trigonometric functions. (2003) In the Penguin Dictionary of Mathematics.*

(Continued)

*Primary Examiner* — Alan Cariaso
(74) *Attorney, Agent, or Firm* — Clay McGurk; The Law Office of Clay McGurk

(57) ABSTRACT

A light module including a single light emitting diode (LED) and a rotationally symmetrical reflective light transformer providing an omnidirectional pattern with a pre-calculated intensity distribution. In alternative embodiments the light module may consist of a plurality of LEDs and the reflective light transformer, having plurality of identical segments, provides an omnidirectional pattern with a pre-calculated intensity distribution as a result of superposition of the limited angle pattern reflected by each segment. In order to provide high efficiency the light transformer reflective surface profile is designed using a given LED's spatial intensity distribution and required intensity distribution across the emitted omnidirectional pattern as a design parameters.

4 Claims, 7 Drawing Sheets

U.S. PATENT DOCUMENTS

| | | | |
|---|---|---|---|
| 5,105,347 A | 4/1992 | Ruud et al. | |
| 5,134,550 A | 7/1992 | Young | |
| 5,136,483 A | 8/1992 | Schoniger et al. | |
| 5,161,874 A | 11/1992 | Benes | |
| 5,180,221 A | 1/1993 | Yoder | |
| 5,289,356 A | 2/1994 | Winston | |
| 5,321,717 A | 6/1994 | Adachi et al. | |
| 5,363,469 A | 11/1994 | Elderfield | |
| 5,408,395 A | 4/1995 | Schmid et al. | |
| 5,467,335 A | 11/1995 | Braat | |
| 5,469,347 A | 11/1995 | Duve et al. | |
| 5,471,371 A | 11/1995 | Koppolu et al. | |
| 5,553,174 A | 9/1996 | Snyder | |
| 5,556,189 A | 9/1996 | Wallis | |
| 5,575,550 A | 11/1996 | Appeldorn et al. | |
| 5,592,578 A | 1/1997 | Ruh | |
| 5,621,829 A | 4/1997 | Ford | |
| 5,629,996 A | 5/1997 | Rizkin et al. | |
| 5,642,933 A * | 7/1997 | Hitora | 362/243 |
| 5,661,828 A * | 8/1997 | Riser et al. | 385/31 |
| 5,694,112 A * | 12/1997 | VannRox et al. | 340/472 |
| 5,704,709 A | 1/1998 | Zwick et al. | |
| 5,707,130 A | 1/1998 | Zwick et al. | |
| 5,775,792 A | 7/1998 | Wiese | |
| 5,785,410 A | 7/1998 | Branson, Sr. | |
| 5,800,050 A | 9/1998 | Leadford | |
| 5,813,743 A | 9/1998 | Naka | |
| 5,854,872 A | 12/1998 | Tai | |
| 5,926,320 A | 7/1999 | Parkyn, Jr. et al. | |
| 5,929,788 A * | 7/1999 | Vukosic | 362/297 |
| 5,931,575 A * | 8/1999 | Yamamoto et al. | 362/518 |
| 5,951,144 A | 9/1999 | Gavigan et al. | |
| 6,013,985 A | 1/2000 | Green et al. | |
| 6,028,535 A | 2/2000 | Rizkin et al. | |
| 6,048,083 A | 4/2000 | McDermott | |
| 6,075,650 A | 6/2000 | Morris et al. | |
| 6,097,549 A | 8/2000 | Jenkins et al. | |
| 6,107,916 A | 8/2000 | Beck et al. | |
| 6,132,072 A | 10/2000 | Turnbull et al. | |
| 6,155,703 A | 12/2000 | Rizkin et al. | |
| 6,168,294 B1 | 1/2001 | Erni et al. | |
| 6,210,017 B1 | 4/2001 | Miura et al. | |
| 6,217,197 B1 * | 4/2001 | Siminovitch et al. | 362/297 |
| 6,234,646 B1 * | 5/2001 | Ito | 362/241 |
| 6,334,699 B1 | 1/2002 | Gladnick | |
| 6,380,864 B1 | 4/2002 | Richard | |
| 6,402,347 B1 | 6/2002 | Maas et al. | |
| 6,450,661 B1 | 9/2002 | Okumura | |
| 6,464,373 B1 * | 10/2002 | Petrick | 362/247 |
| 6,547,423 B2 | 4/2003 | Marshall et al. | |
| 6,565,239 B2 | 5/2003 | Rizkin et al. | |
| 6,568,827 B2 | 5/2003 | Forster | |
| 6,637,921 B2 * | 10/2003 | Coushaine | 362/517 |
| 6,899,443 B2 * | 5/2005 | Rizkin et al. | 362/327 |
| 7,160,004 B2 | 1/2007 | Peck | |
| 7,568,821 B2 * | 8/2009 | Peck et al. | 362/341 |
| 2002/0136027 A1 | 9/2002 | Hansler et al. | |
| 2003/0189832 A1 | 10/2003 | Rizkin et al. | |
| 2003/0193807 A1 | 10/2003 | Rizkin et al. | |
| 2005/0190559 A1 * | 9/2005 | Kragl | 362/296 |
| 2006/0209541 A1 | 9/2006 | Peck | |
| 2006/0268549 A1 | 11/2006 | Oehlke | |

FOREIGN PATENT DOCUMENTS

| | | |
|---|---|---|
| DE | 4128995 | 8/1991 |
| DE | 4129094 | 9/1991 |
| DE | 4305585 | 2/1993 |
| DE | 4243175 | 6/1994 |
| DE | 19507234 A1 | 2/1995 |
| DE | 19507234 | 9/1996 |
| DE | 29708858 | 5/1997 |
| DE | 19647094 | 6/1997 |
| DE | 19728354 | 1/1999 |
| DE | 19739173 C2 | 3/1999 |
| EP | 0635744 | 10/1993 |
| EP | 0766115 | 9/1996 |
| EP | 0780265 | 12/1996 |
| EP | 0798788 | 1/1997 |
| EP | 0798788 | 2/1997 |
| EP | 0762515 | 3/1997 |
| EP | 0942225 | 3/1999 |
| JP | 61147585 | 7/1986 |
| JP | 61147585 A | 7/1986 |
| JP | 63033879 | 2/1988 |
| JP | 1125719 | 5/1989 |
| WO | 9901695 A1 | 7/1997 |
| WO | 9909349 A1 | 8/1997 |
| WO | 0024062 | 4/2000 |
| WO | WO 0024062 | 4/2000 |

OTHER PUBLICATIONS

Office Action in U.S. Appl. No. 10/316,642 (USP 6,814,470), dated Feb. 20, 2004.
Notice of Allowability in U.S. Appl. No. 10/316,642 (USP 6,814,470), dated Aug. 10, 2004.
Examiner Interview in U.S. Appl. No. 10/316,642 (USP 6,814,470), dated Aug. 10, 2004.
Notice of Allowability in U.S. Appl. No. 10/620,524 (USP 6,902,291), dated Dec. 16, 2004.
Notice of Allowability in U.S. Appl. No. 11/930,423, dated Dec. 9, 2009.
Notice of Allowability in U.S. Appl. No. 10/391,327 (USP 6,951,418), dated Mar. 22, 2005.
Office Action in U.S. Appl. No. 10/391,327 (USP 6,951,418), dated Dec. 12, 2003.
Office Action in U.S. Appl. No. 10/391,327 (USP 6,951,418), dated Jun. 9, 2004.
Notice of Allowability in U.S. Appl. No. 10/408,923 (USP 6,899,443), dated Jan. 24, 2005.
Office Action in U.S. Appl. No. 10/408,923 (USP 6,899,443), dated Jul. 13, 2004.
Communication from EPO related to European Patent Application No. 06016404.3, dated Nov. 30, 2009.
EPO Examination in 019357631, dated Apr. 29, 2005.
EPO Search Report in 019357631, dated Dec. 29, 2004.
International Search Report for PCT/US04/23037, dated Mar. 28, 2005.
International Search Report for PCT/US03/33227, dated Sep. 1, 2009.
International Search Report for PCT/US2008/081981, dated Feb. 2, 2009.
Notice of Allowability in U.S. Appl. No. 11/930,423, dated Mar. 23, 2010.

* cited by examiner

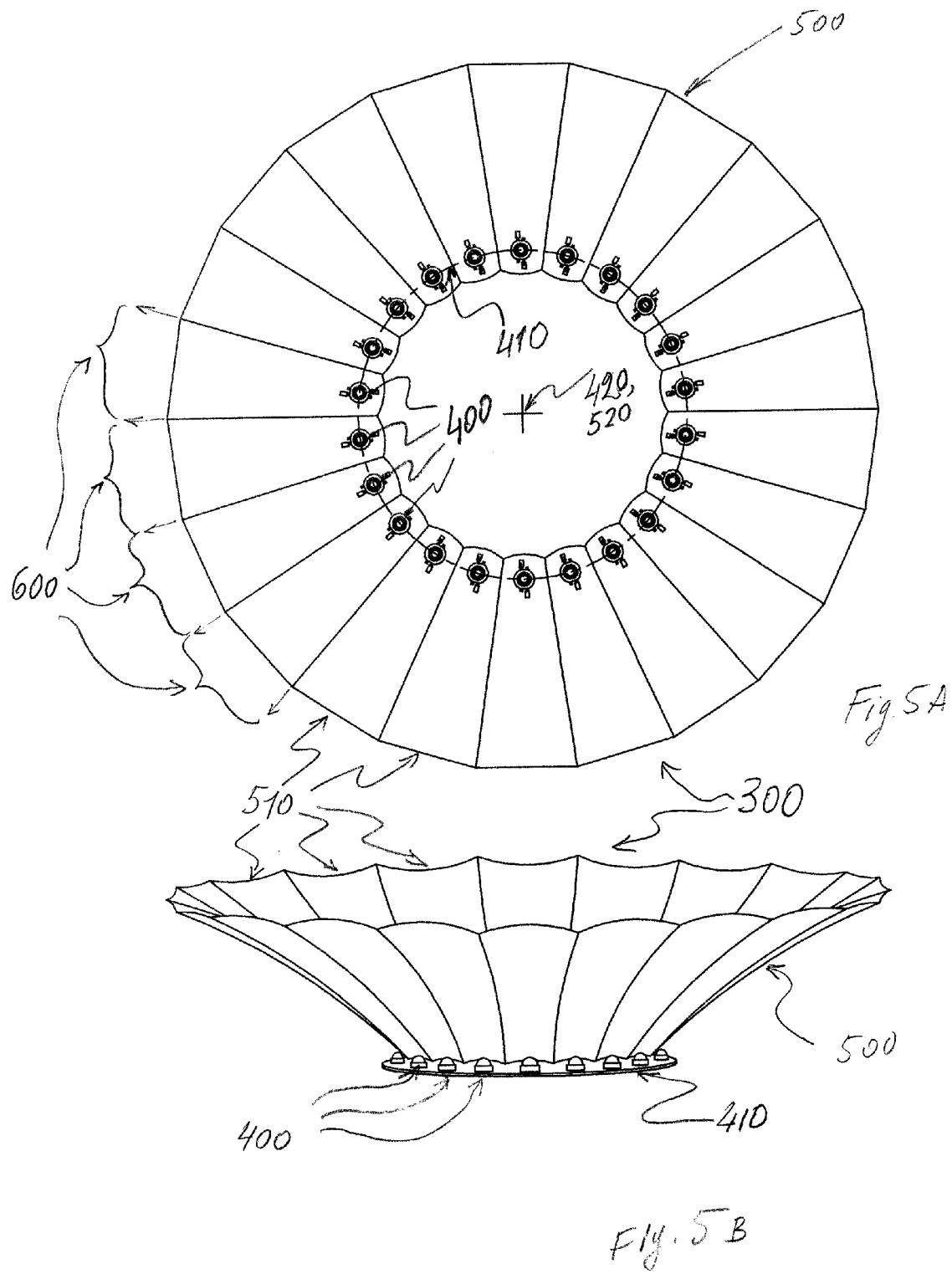

LED LIGHT MODULE FOR OMNIDIRECTIONAL LUMINAIRE

CROSS-REFERENCE TO RELATED APPLICATION

This application is a continuation-in-part of and claims priority to U.S. patent application Ser. No. 10/277,230, filed Oct. 21, 2002 now U.S. Pat. No. 7,503,669; which is a continuation-in-part of U.S. patent application Ser. No. 09/566, 521, filed May 8, 2000, now U.S. Pat. No. 6,543,911 and is herein incorporated by reference.

BACKGROUND OF THE INVENTION

1. Field of Invention

The present invention relates generally to light sources utilizing light emitting diodes (LEDs). In particular, the present invention relates to aviation signal lights providing omnidirectional patterns, such as a runway edge light, obstruction light and similar, where requirements for specific light distribution across the pattern are mandatory.

2. Discussion of Relevant Prior Art

Signal lights such as airfield lights and aviation obstruction lights require certification by the government (Federal Aviation Authority) or international organizations (ICAO). These specifications identify photometrics in detail. For example, ICAO specifications for medium intensity flashing red obstruction lights call for peak intensity minimum 2000 candelas + or −25% at horizontal level and allow maximum intensity limited by 75% of peak at −1%, with beam spread 3°. Application of solid-state technology (LEDs) as a light source because of the low power consumption, long lifetime, and smaller and lighter-weight design, makes it possible to overcome major disadvantages of conventional light sources, such as incandescent and halogen lamps. However, the solid-state technology's total efficiency in a luminaire, in practice, does not exceed 60%. This is why the performance of LED-based signal lights depends on implanted optics, specifically secondary optics light transformers which transforms light emitted by LEDs into light patterns required by specifications. In order to increase LED luminaire performance up to 85% to 90%, non-imaging light transformers, refractive and reflective (including total internal reflection properties) can be implemented. The method of design based on use, both the specifics parameters of the particular light source (such as LED spatial light distribution) and required light distribution across the pattern as a light transformer's design parameters are described in detail in U.S. Pat. No. 6,543,911.

BRIEF SUMMARY OF THE INVENTION

The present invention provides a LED light module (combination of LED and optic) based on light transformer with reflective surface profile (including total internal reflection surface profile) being calculated by taking into account specific LED parameters (spatial intensity distribution), required intensity distribution across emitted pattern and the geometrical relation of components. A single or multiple LED can be used to produce omnidirectional light distribution in a horizontal plane wherein the angle in the vertical plan remains limited. The LED module also can include an optical window and LED heatsink.

According to one aspect of the present invention the light module comprises at least one LED emitting light with a wide divergency and rotationally symmetrical reflective light transformer having a vertex located on the light transformer's axis of symmetry, which is coincidental with the LED axis. The light transformer reflective surface profile is determined by LED spatial intensity distribution across emitted pattern and light module geometry. The light transformer collects light emitted by the LED, compresses, redistributes, and directs the collected light with high efficiency in an omnidirectional pattern with pre-calculated intensity distribution.

According to the second aspect of the present invention, which is related to particular case when angular distribution is smaller than LED half-angle distribution, the reflective light transformer surface includes a plurality of circular facets, each facet profile being determined by LED spatial intensity distribution, required intensity distribution across emitted pattern and light module geometry. Each facet collects a portion of the light emitted by the LED, compresses, redistributes, and directs the collected light with efficiency in the same limited angle pattern in a vertical plane and a superposition of light pattern from all facets resulting in an omnidirectional pattern with pre-calculated intensity distribution.

In an alternative embodiment the light module comprising a plurality of LEDs, each LED emitting light with wide divergency, and reflective light transformer including a plurality of identical concave curved segments, each segment corresponds to an LED. The LED axes are parallel to the reflective light transformer axis. In a plane perpendicular to the LED optical axes the LED form a substantially circular array with the center of the circle located on the reflective light transformer axis. The concave curved segment's reflective surface profile is determined by the LED spatial intensity distribution, required intensity distribution across the emitted pattern and light module geometry. Each segment of the reflective light transformer collects light emitted by an associated LED, compresses, redistributes and directs the collected light with high efficiency in a limited angle in the plane perpendicular to the LED optical axis and superposition of pattern from a plurality of segments providing an omnidirectional pattern with a pre-calculated intensity distribution.

In another similar embodiment, the reflective light transformer's concave curved segment's surface includes a plurality of facets. Each facet reflective surface profile is determined by the corresponding portion of the LED spatial intensity distribution, required intensity distribution across emitted pattern and light module geometry. Each facet collects a portion of the light emitted by the corresponding LED from a circular array, compresses, redistributes, and directs the collected light with high efficiency in a limited angle pattern in the vertical plane and superposition of the light pattern from all facts in the vertical plane and all segments in the plane perpendicular to the LED optical axes resulting in an omnidirectional pattern with pre-calculated intensity distribution.

In another embodiment, the light module comprising a plurality of LEDs, each LED emitting light with wide divergence and a reflective light transformer including a plurality of identical concave curved segments. The LEDs optical axes are parallel to the reflective light transformer axis and in a plane perpendicular to LEDs optical axes wherein the LEDs are forming substantially polygon array with an equal number of LEDs in each polygon side, and the number of polygon sides are equal to number of concave curved segments, and each segment corresponds to a polygon side. The concave curved segments' reflective surface profile is determined by a combination of the spatial intensity distribution of all the LEDs located on a corresponding polygon side, required intensity distribution across emitted pattern and light module geometry. Each segment of the reflective light transformer collects light emitted by all the LEDs located on the corresponding polygon side, compresses, redistributes and directs collected light with high efficiency in a limited angle pattern in a plane perpendicular to the LEDS optical axes, and superposition of the pattern from a plurality of segments provides an omnidirectional pattern with pre-calculated intensity distribution.

Yet in another similar embodiment, the reflective light transformer's concave curved segment's surface consists of a plurality of facets. The facet's reflective surface profile is determined by combining the spatial intensity distribution of all LEDs located on the corresponding polygon side, required intensity distribution across emitted pattern and light module geometry. Each facet collects a portion of the light emitted by the LEDs located on the corresponding polygon side, compresses redistributes and directs collected light with high efficiency in a limited angle patter in the plane perpendicular to the LEDs optical axes and a superposition of the light pattern from all facets and all the segments resulting in an omni-directional pattern with pre-calculated intensity distribution.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

FIGS. 5(a) and (b) are top view and perspective view of the light module according to another embodiment.

DETAILED DESCRIPTION OF THE PREFERRED EMBODIMENTS

Figure 1:
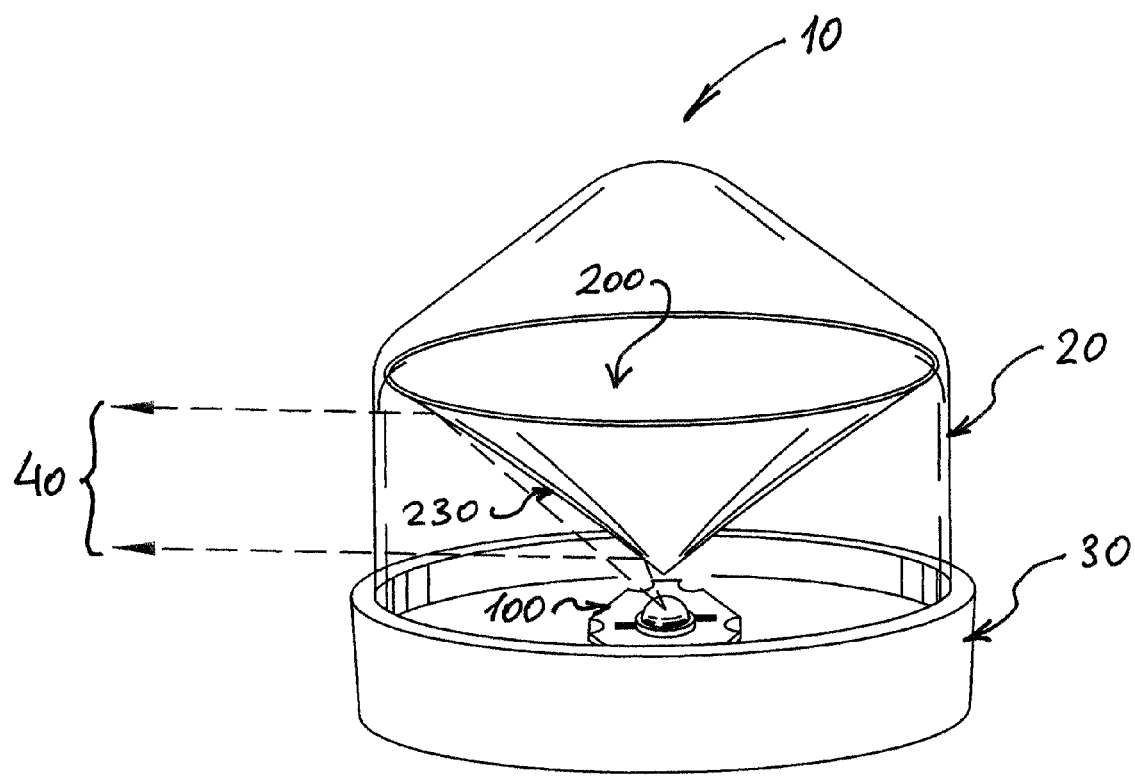
FIG. 1 is a perspective view of the light module for the omnidirectional luminaire.

FIG. 1 is a perspective view of a light module for the omnidirectional luminaire 10. The light module 10 may comprise one or more LEDs 100 and a reflective light transformer 200. The light module 10 also can include an optical omnidirectional window 20 and a LED heat sink 30.

In operation, the light emitted by the LED 100 with given spatial intensity distribution is reflected by the reflective light transformer surface 230, transformed and directed omnidirectionally in 360° pattern 40, with a pre-calculated intensity distribution. In order to achieve high efficiency (80% and higher) the light transformer should be designed to take into account both the specifics of the light sources (such as the LED spatial intensity distribution) and the desirable light distribution across the emitted pattern.

Figure 2:
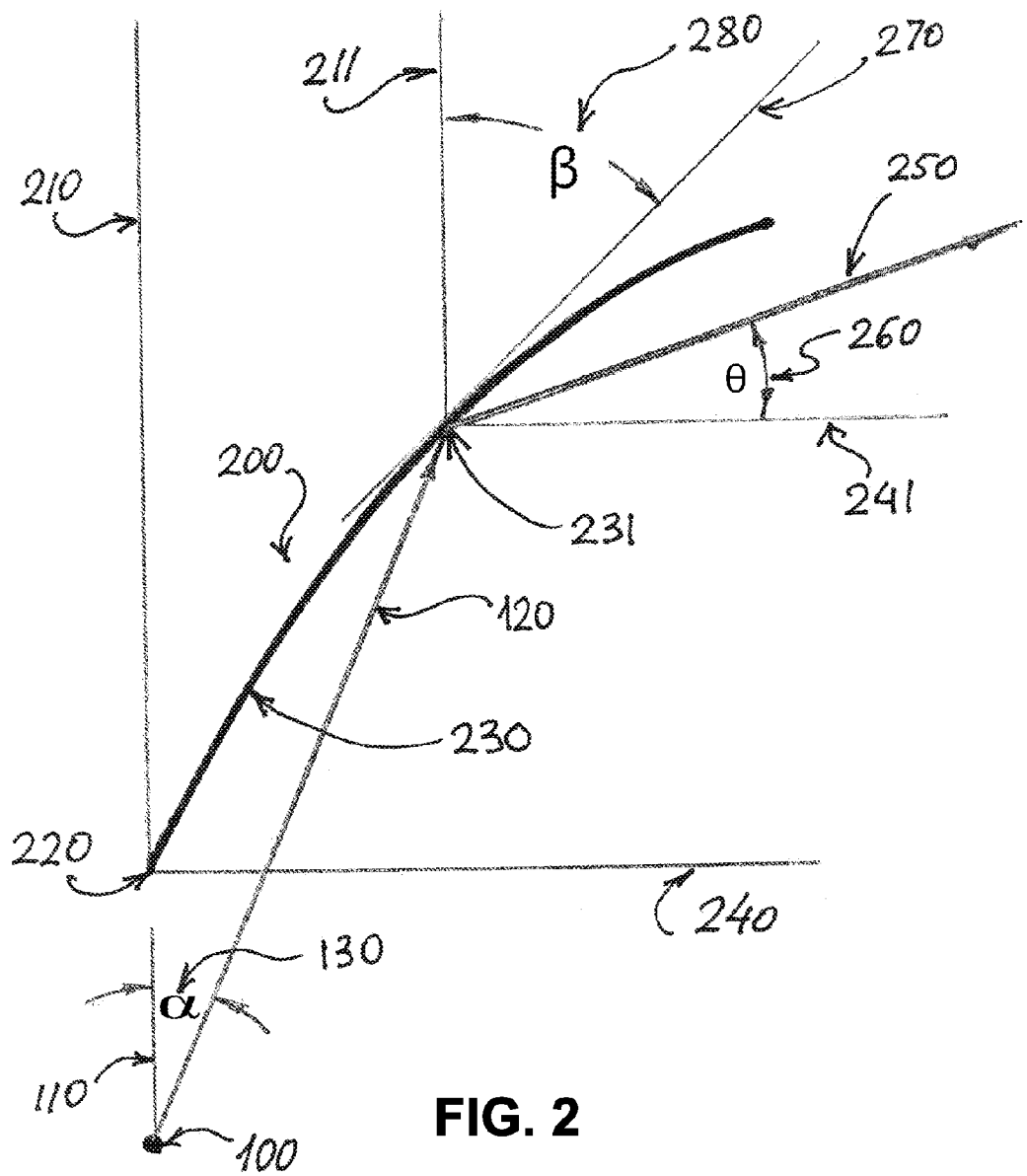
FIG. 2 is an illustration of the method of reflective transformer design.

The method of reflective light transformer surface profile design using light source spatial intensity distribution and required intensity distribution across the emitted pattern as design conditions is described in detail in U.S. Pat. No. 6,543,911 and illustrated in FIG. 2.

The optical axis 110 of light source (LED) 100 is coincidental with the axis of symmetry 210 of rotationally symmetrical reflective light transformer 200, having vertex 220 located on the axis of symmetry. The reflective light transformer's surface profile 230 is calculated as a step-by-step iterative procedure using a given light source spatial distribution in the emitted pattern. For example, arbitrary point 231 of reflective transformer surface reflects ray 120, emitted by light source 100 on an angular coordinate 130 relative to light source optical axis 110, belonging to the light source domain. To transfer the portion of the light energy corresponding to this direction into an emitted pattern, the reflected ray 250 must be reflected on an angular coordinate 260 relative to axis 241 in a pattern domain, which is orthogonal to the axis of symmetry 210. The orthogonal coordinates 211 and 241 are parallel to coordinates 210 and 240 respectively and the origin located in arbitrary point 231. As a result, the curvature of the reflective transformer surface profile in the arbitrary point 231 will be determined by the angular coordinate 280 of tangent 270 to the profile in the arbitrary point 231, relative to the transformer axis of symmetry 210.

Figure 3:
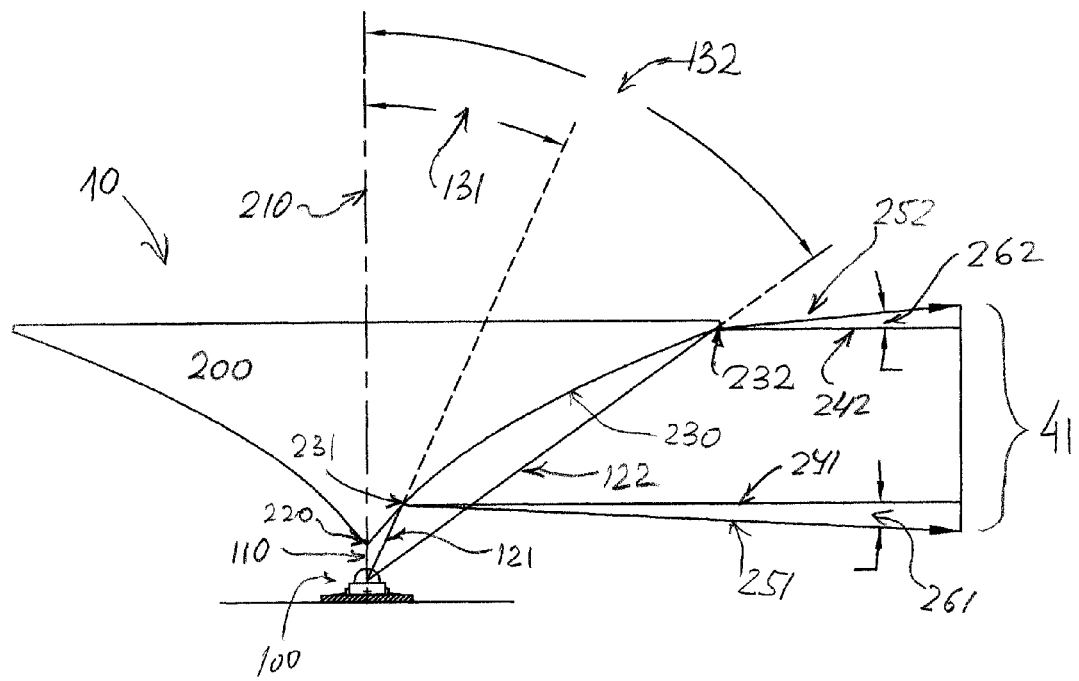
FIG. 3 is a cross-sectional diagram of the light module according to one embodiment.

FIG. 3 is a cross-sectional diagram of the light module 10 according to a preferred embodiment. The light module 10 can include a single LED 100 and a rotationally symmetrical reflective light transformer 200, having a vertex located on the light transformer axis of symmetry 210, which is coincidental with the LED 100 optical axis 110. In operation, a ray 121 emitted by the LED 100 at angular coordinate 131 with respect to LED's 100 optical axis 110 reflects from the arbitrary point 231 of light transformer's 200 reflective surface 230 as a ray 251, which is directed in a pattern domain 41 at an angular coordinate 261 with respect to axis 241 orthogonal to the light transformer's 200 axis of symmetry 210. Accordingly, a ray 122 emitted by the LED 100 at angular coordinate 132 with respect to the LED's 100 optical axis 110 reflects from arbitrary point 232 of light transformer's 200 reflective surface 230 as a ray 252, which is directed in pattern domain 41 at an angular coordinate 262 with respect to axis 242 orthogonal to the light transformer's 200 axis of symmetry 210. As a result, the reflective light transformer 200 redistribute given LED 100 intensity distribution from angular coordinate 131 to angular coordinate 132 into a pre-calculated pattern 41 with intensity distribution from angular coordinate 261 to angular coordinate 262.

Figure 4:
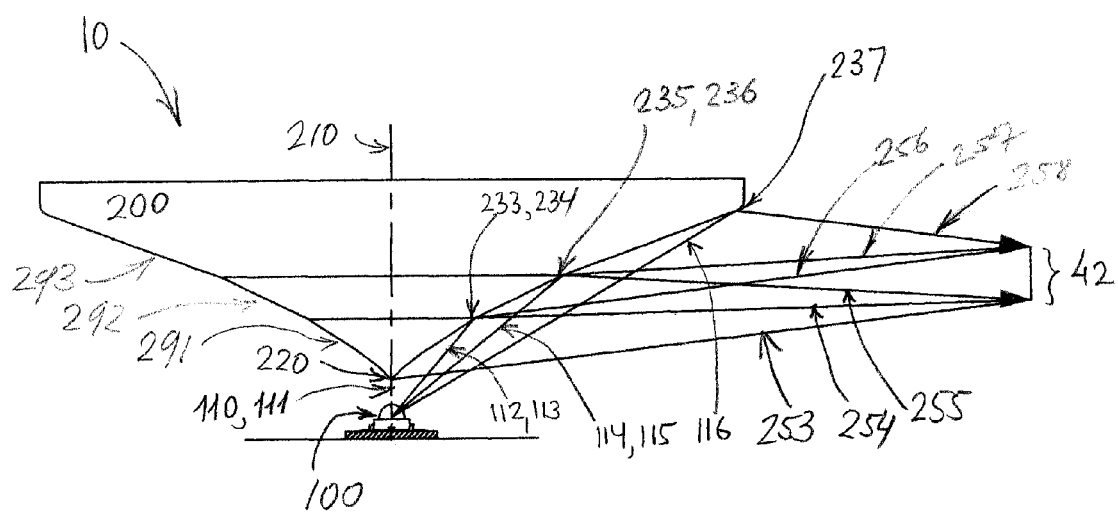
FIG. 4 is a cross-sectional diagram of the light module according to another embodiment.

FIG. 4 is a cross-sectional diagram of the light module 10 according to another embodiment. The light module 10 can include a single LED 100 and a rotationally symmetrical light transformer 200, having a vertex 220 located on the light transformer axis of symmetry 210, which is coincidental with the LED optical axis 110. The light transformer's 200 reflective surface consists of a plurality of circular facets 291, 292, 293, each facet profile is determined by the corresponding portion of the LED spatial intensity distribution, required intensity distribution across the emitted pattern, and the light module geometry. In operation, a portion of the light emitted by the LED 100 is redirected by each facet into pattern domain 42. For example, ray 111 is substantially coincident with the LED optical axis 110 and reflected from the vertex 220 as a ray 253. A ray 112, emitted by LED 100, reflects from the point 233 (which belongs to facet 291), as a ray 256. As a result, a portion of the light emitted by LED 100 in the spatial domain between rays 111 and 112 is redistributed and redirected in pattern domain 42. Similar, ray 113, which is almost coincident with ray 112 reflects from point 234 (which is next to point 233, but in contrast belongs to facet 292), as a ray 254. Further ray 114 reflects from point 235 as a ray 257, ray 115 reflects from point 236 (belonging to facet 293), as a ray 255, ray 116 reflects from point 237 as a ray 258, and so on. As a result, each facet collects a corresponding portion of the light emitted by the LED 100, compresses, redistributes and directs the collected light with high efficiency in the pattern domain 42 and superposition of light pattern from all of the facets results in an omnidirectional pattern with a pre-calculated intensity distribution.

FIGS. 5 (a) and (b) are top and perspective views respectively of the light module according to another embodiment. Light module 300 comprising a plurality of LEDs 400 and reflective light transformer 500, which consists of a plurality of identical concave curved segments 510, each segment corresponds to a LED 400. LED's 400 axes are parallel to the reflective transformer axis 520. The concave curved segment's reflective surface profile is determined by the LED 400 spatial intensity distribution, required intensity distribution across emitted pattern and light module 300 geometry. A surface profile of each of the concave curved segments is defined by an equation $R[(\alpha,\beta); \theta]=F\{I_s(\alpha,\beta); I_p(\theta)\}$ where $R[(\alpha,\beta);\theta]$ is a surface profile of each of the concave curved segments, $\alpha$, $\beta$ are two dimensional angular coordinates belonging to a light source domain, $\theta$ is an angular coordinate relative to an orthogonal axis to an axis of symmetry of the reflective light transformer belonging to a pattern domain, $I_s(\alpha,\beta)$ is spatial intensity distribution of the light source, $I_p(\theta)$ is a required intensity distribution across an emitted pattern, and $F\{\ \}$ is an arbitrary function determined by a method of design. Each segment 510 of the reflective light transformer 500 collects light emitted by corresponding LED 400, compresses, redistributes and directs the collected light with high efficiency in a limited angle pattern 600 in the plane perpendicular to the LEDs 400 optical axes and superposition of pattern 600 from the plurality of segments 510 provides an ominidirectional pattern with a pre-calculated intensity distribution.

Figures 6A, 6B:
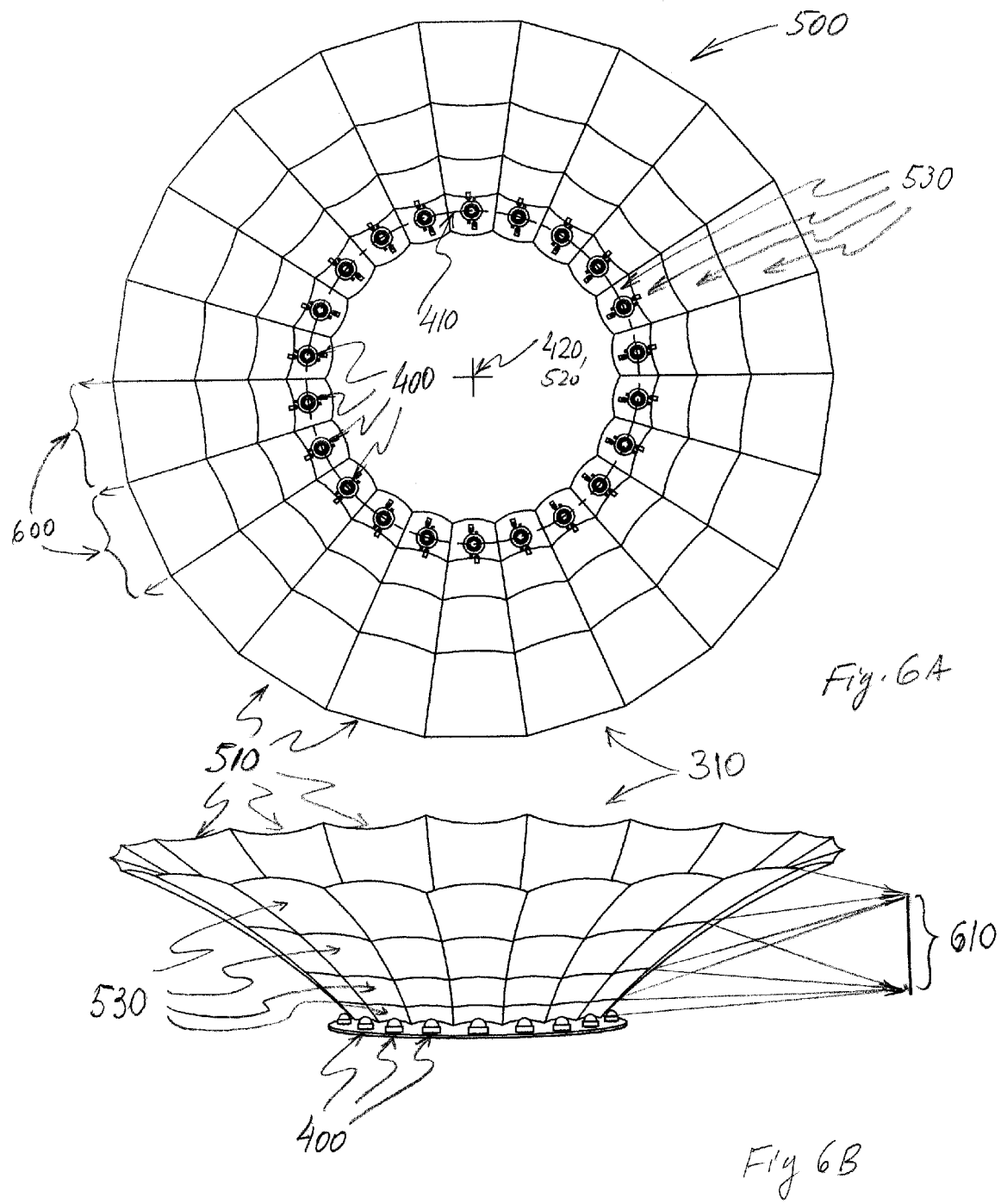
FIGS. 6(a) and (b) are top view and perspective view of the light module according to another embodiment.

FIGS. 6 (a) and (b) are top and perspective views respectively of the light module 310 according to another embodiment. The light module 310 comprising a plurality of LEDs 400 and a reflective light transformer 500, which consists of a plurality of identical concave curved segments 510, each segment corresponds to a LED 400. The LED's 400 axes are parallel to the reflective transformer axis 520. In a plane perpendicular to the LED 400 optical axes, the LEDs form a substantially circular array 410 with the center of the circle 420 located on the reflective light transformer's 500 axis 520. Each reflective light transformer's 500 concave curved segments 510 surface consists of a plurality of facets 530. The facets reflective surface profile is determined by the corresponding portion's required intensity distribution across emitted pattern and light module 310 geometry. Each facet 530 collects a portion of the light emitted by the corresponding LED 400 from the circular array 410, compresses, redistributes and directs collected light with high efficiency in a limited angle pattern 610 in the vertical plane, and superposition of light pattern 610 from all facets and light pattern 600 from all segments resulting in an omnidirectional pattern with a pre-calculated intensity distribution.

Figure 7A:
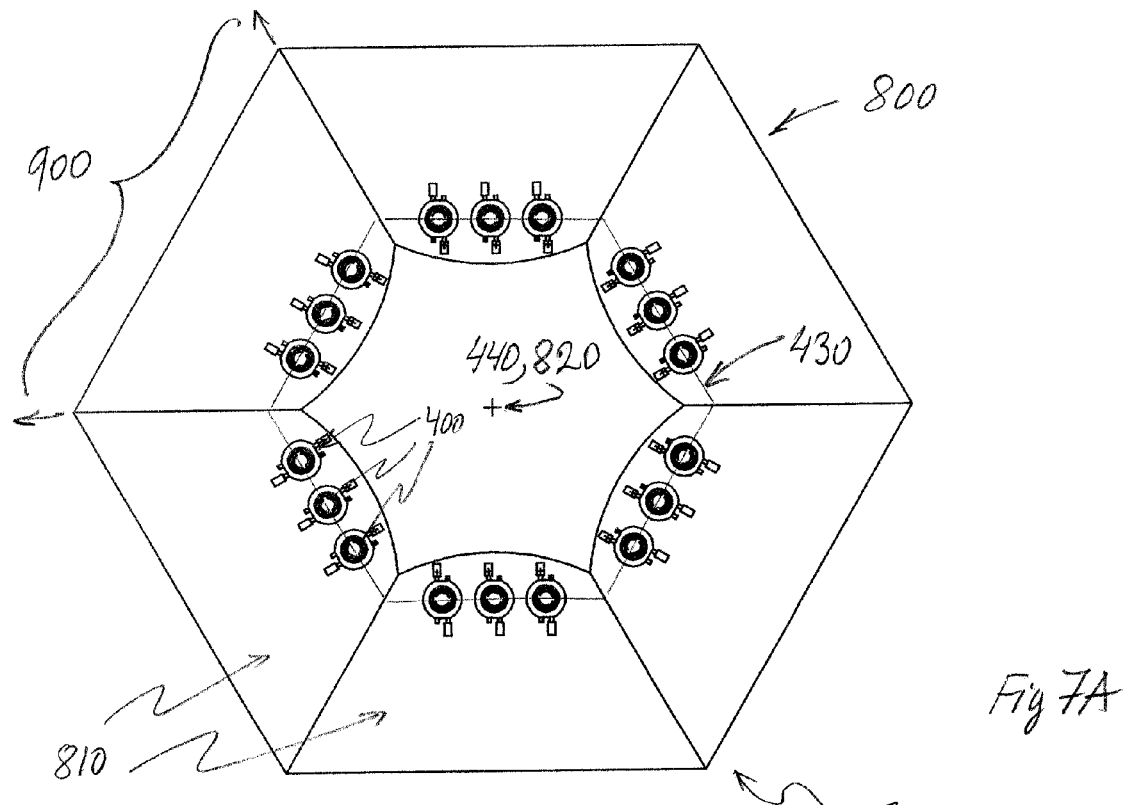
FIGS. 7(a) and (b) are top view and perspective view of the light module according to another embodiment.
Figure 7B:
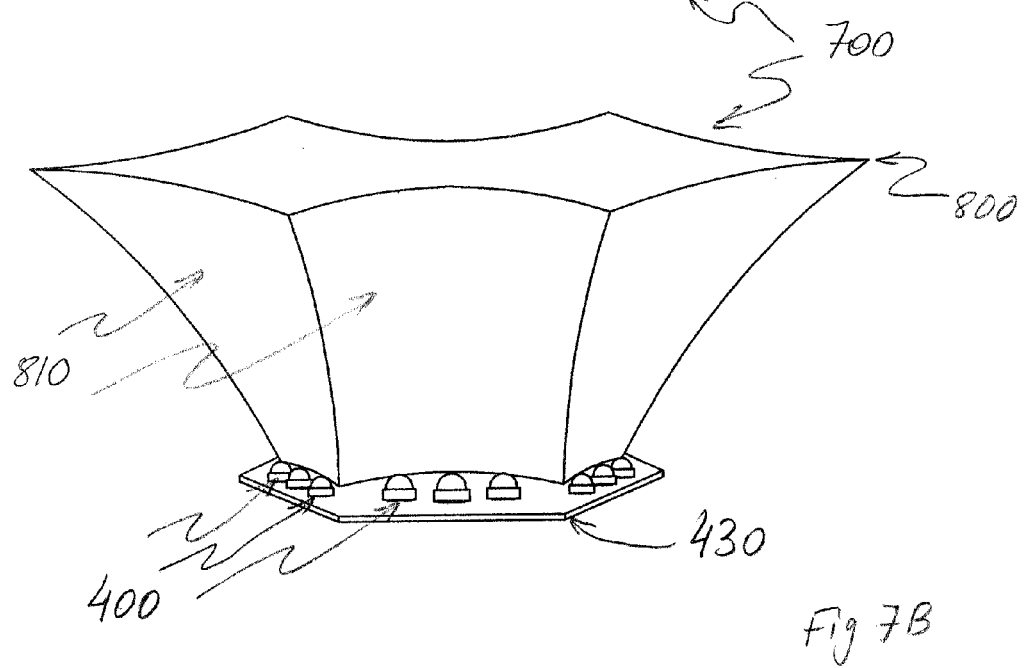

FIGS. 7(a) and (b) are top and perspective views respectively of the light module 700 according to another embodiment. The light module 700 comprising a plurality of LEDs 400 and a reflective light transformer 800, which consists of a plurality of identical concave curved segments 810. The LED's axes are parallel to reflective transformer 800 axis 820. In a plane perpendicular to LEDs optical axes LEDs 400 form substantially a polygon array 430 with an equal numbers of LEDs in each polygon side, the number of polygon sides equal to the number of concave curved segments 810, and each segment 810 corresponds to a side of the polygon array 430. The polygon array center 440 located on reflective transformer's 800 axis 820. The concave curved segment's reflective surface profile is determined by combining the spatial intensity distribution of all the LEDs located on the corresponding polygon side, required intensity distribution across emitted pattern and the light module 700 geometry. Each segment 810 of the reflective light transformer 800 collects light emitted by all the LEDs, compresses, redistributes and directs the collected light with high efficiency in a limited angle pattern 900 in a plane perpendicular to the LEDs optical axes and superposition of pattern 900 from plurality of segments 800 providing an ominidirectional pattern with a pre-calculated intensity distribution.

Figure 8A:
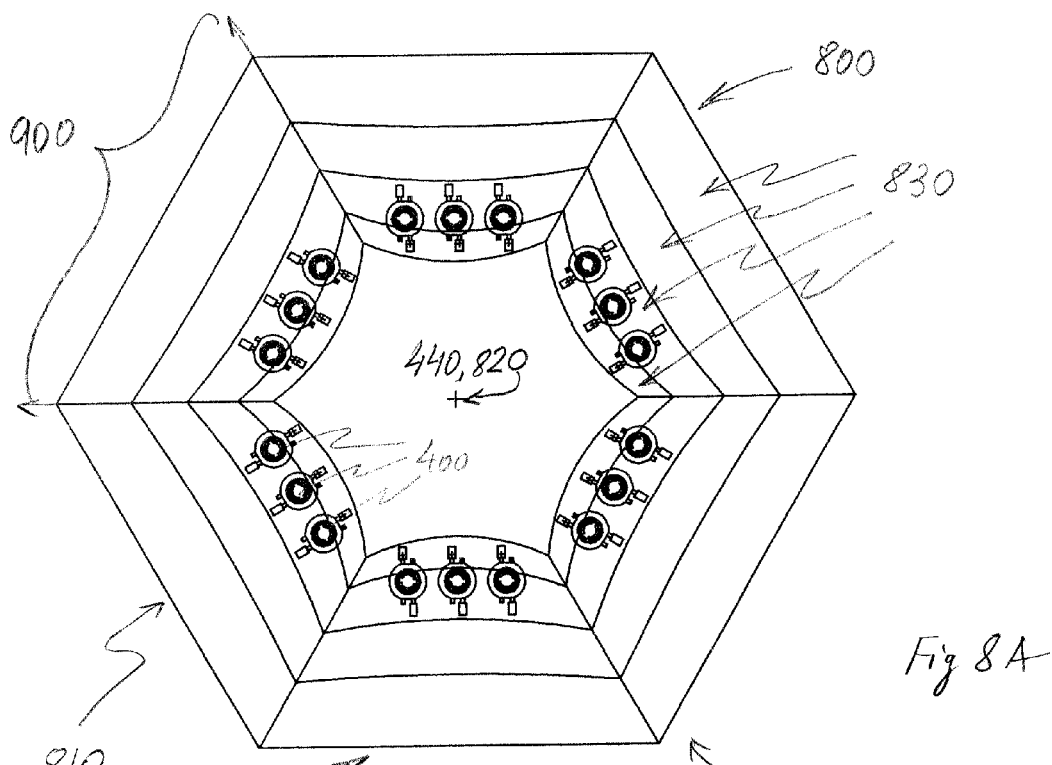
FIGS. 8(a) and (b) are top view and perspective view of the light module according to another embodiment.
Figure 8B:
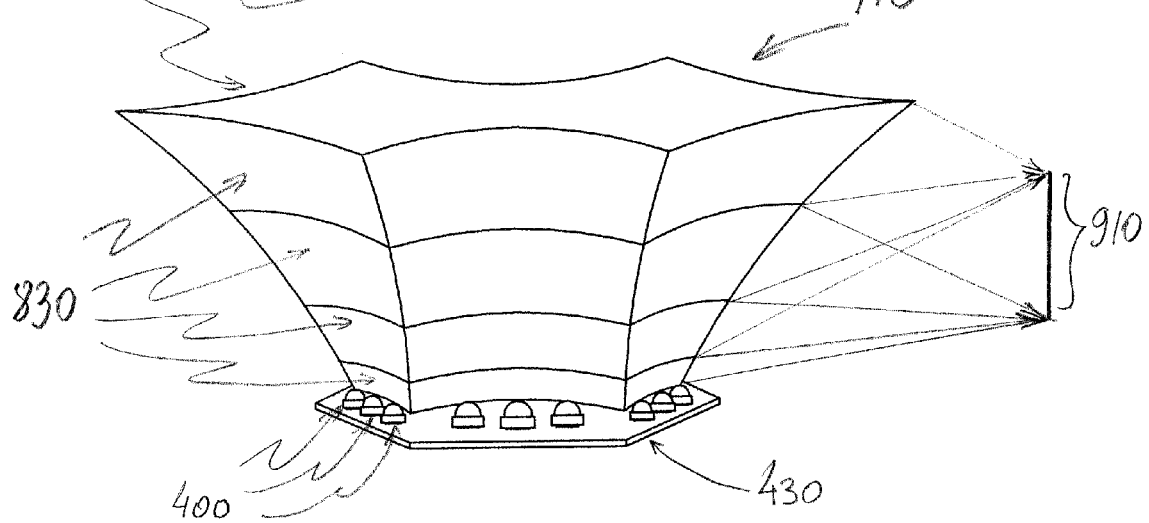

FIGS. 8(a) and (b) are top and perspective views respectively of the light module 710 according to another embodiment. The light module 710 comprising a plurality of LEDs 400 and a reflective light transformer 800, which consists of a plurality of identical concave curved segments 580. The LED's 400 axes are parallel to the reflective transformer 800 axis 820. In a plane perpendicular to LEDs optical axes, the LED 400 form a substantially polygon array 430 with equal numbers of LEDs in each polygon side, the number of polygon sides equal to the number of concave curved segments 810, and each segment 810 corresponding to a side of the polygon array 430. The polygon array 430 center 440 is located on the reflective transformer's 800 axis 820. The concave curved segment's 810 surface profile consists of a plurality of facets 830. The facet reflective surface profile is determined by a portion of the combined spatial intensity distribution of all the LEDs located on the corresponding polygon side, the required intensity distribution across the emitted pattern and the light module 710 geometry. A surface profile of each of the concave curved segments is defined by an equation $R[(\alpha,\beta); \theta]=F\{\Sigma_n I_s(\alpha,\beta); I_p(\theta)\}$ where $R[(\alpha,\beta); \theta]$ is a surface profile of each of the concave curved segments, $\alpha$, $\beta$ are two dimensional angular coordinates belonging to a light source domain, $\theta$ is an angular coordinate relative to an orthogonal axis to an axis of symmetry of the reflective light transformer belonging to a pattern domain, $\Sigma_n I_s(\alpha,\beta)$ is a combined spatial intensity distribution of all the LEDs located on a corresponding polygon side, n is a number of the LEDs on a polygon side, $I_p(\theta)$ is a required intensity distribution across an emitted pattern, and $F\{\ \}$ is an arbitrary function determined by a method of design. Each facet 830 collects a portion of the light emitted by all the LEDs located on the corresponding side of the polygon array 430, compresses, redistributes and directs the collected light with high efficiency in a limited angle pattern 910 in the vertical plane and superposition of light pattern 910 from all facets 830 in the vertical plane, and all limited angle pattern 900 in the plane perpendicular to the LEDs optical axes from a plurality of segments 810 provides an ominidirectional pattern with a pre-calculated intensity distribution.

While we have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

We claim:

1. A light module comprising:
    at least one light emitting diode (LED) for emitting light with wide divergence; and
    a reflective light transformer being rotationally symmetrical and having a vertex located on an axis of symmetry coincident with an optical axis of the LED,
    wherein in order to obtain high efficiency, a surface profile of the reflective light transformer is defined by an equation $$R(\alpha;\theta)=F\{I_s(\alpha);I_p(\theta)\}$$

wherein $R(\alpha;\theta)$ is the surface profile of the reflective light transformer, $\alpha$ is an angular coordinate relative to an axis of symmetry of the reflective light transformer belonging to a domain of the LED, $\theta$ is an angular coordinate relative to an orthogonal axis to the axis of symmetry belonging to a pattern domain, $I_s$ is a light source spatial intensity distribution, $I_p(\theta)$ is a required intensity distribution across an emitted pattern, and $F\{\ \}$ is an arbitrary functional determined by a method of design, wherein the reflective light transformer collects light emitted by the LED, compresses, redistributes, and directs collected light with high efficiency in an omnidirectional pattern with pre-calculated intensity distribution.

2. The light module according to claim 1, wherein a surface of the reflective light transformer comprises a plurality of circular facets, each facet collects a portion of the light emitted by the LED, compresses, redistributes and directs the collected light with high efficiency in a same omnidirectional pattern, and wherein superposition of a light pattern from all facets results in an omnidirectional pattern with a pre-calculated intensity distribution.

3. A light module comprising:
    at least one light emitting diode (LED); and
    a reflective light transformer being rotationally symmetrical and having a vertex located on an axis of symmetry coincident with an optical axis of the LED,
    wherein a surface profile of the reflective light transformer is designed based on a function of a light source spatial intensity distribution and a pre-calculated intensity distribution across a predetermined pattern,
    wherein the reflective light transformer collects rays of the light emitted by the at least one LED, redirects and redistributes the rays where some of the rays cross or merge paths, in the predetermined pattern.

4. A light module comprising:
    at least one light emitting diode (LED); and
    a reflective light transformer being rotationally symmetrical and having a vertex located on an axis of symmetry coincident with an optical axis of the LED,
    wherein a surface profile of the reflective light transformer is designed based on a function of a light source spatial intensity distribution and a pre-calculated intensity distribution across a predetermined pattern,
    wherein the reflective light transformer collects rays of the light emitted by the at least one LED and transforms the collected light with an efficiency greater than or equal to 80 percent.

* * * * *